United States Patent Office 3,442,902
Patented May 6, 1969

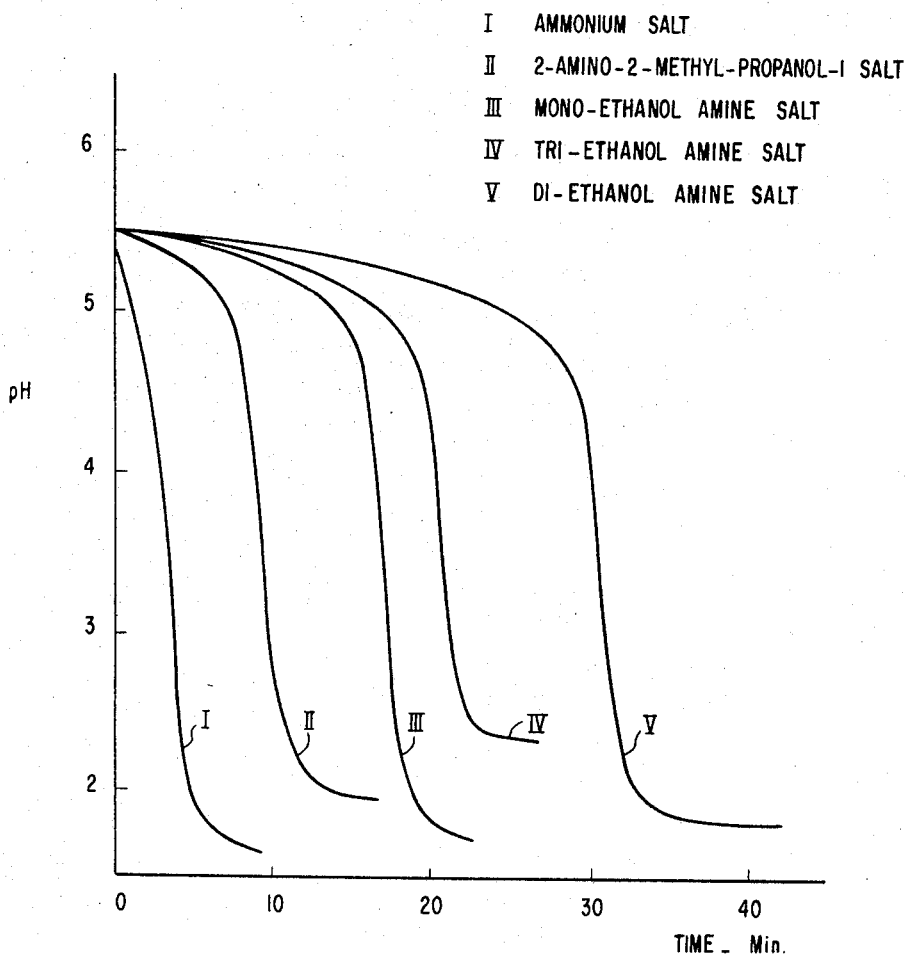
HYDROLYSIS OF IMIDODISULFONATES AT 96°C
INITIAL CONCENTRATION OF IMIDODISULFONATE, 1.60 WT %

3,442,902
BIS-TERTIARY-AMINE SALTS OF IMIDODISULFONIC ACID
Hachiro Yamaguchi, Urawa-shi, and Keiji Nakano, Kawagoe-shi, Japan, assignors to Nitto Chemical Industry Co., Ltd., Tokyo, Japan, and Zaidanhojin Nitto Rikagaku Kenkyujo, Saitama-ken, Japan
Original application Mar. 9, 1964, Ser. No. 350,515, now Patent No. 3,329,720, dated July 4, 1967. Divided and this application Sept. 15, 1966, Ser. No. 618,550
Int. Cl. C07c *143/86;* C08g *51/74*
U.S. Cl. 260—294.8        3 Claims

ABSTRACT OF THE DISCLOSURE

Novel compounds useful, for example, as catalysts are disclosed. The compounds are bis-tertiary amine salts of imidodisulfonic acid where the amine is, for example, pyridine, dimethylaniline, triethylamine, or dimethylbenzylamine.

---

The present invention is a division of our copending application Ser. No. 350,515, filed Mar. 9, 1964, now U.S. Patent No. 3,329,720.

This invention relates to novel and useful compounds and uses of the same. More particularly, it relates to amine salts of imidodisulfonic acid and to use such salts as a curing catalyst for acid-curing amino-plasts.

The compounds of the present invention are the bis-amine salts of imidodisulfonic acid, said amine being (1) a hydroxy amine containing from 3 to 12 carbon atoms and, from 1 to 3 hydroxyl groups, such as ethanol amine and 2-amino-1-methyl-1-propanol, (2) a cyclic ether amine derivable by the intramolecular dehydration of a polyhydroxyamine containing from 2 to 12 carbon atoms and from 2 to 3 hydroxyl groups such as morpholine and N-methylmorpholine, or (3) a tertiary amine containing 3 to 12 carbon atoms, such as trimethylamine, N-alkylmorpholine and pyridine.

These amines may be aliphatic or aromatic, linear or heterocyclic, or normal or branched amines. That is, the amines may contain alkyl, aryl, aralkyl, alkaryl, cyclic and heterocyclic groups and such groups may further be substituted by inorganic groups such as halogens. As heterocyclic tertiaryamine, we prefer saturated one, such as N-methylmorpholine, N-methylpyperidine, to unsaturated one, such as pyridine, quinoline.

As suitable examples of the amines to be used for preparing the imidodisulfonates according to this invention, there are monoethanolamine, monopropanolamine, monobutanolamine, diethanolamine, dipropanolamine, dibutanolamine, triethanolamine, tripropanolamine, tributanolamine, 2-methyl-2-amino-1-propanol, 2-methyl-2-amino-1, 3 - propanediol, 2 - ethyl-2-amino-1-butanol, tris(hydroxymethyl) aminomethane, 2-phenyl-2-amino-1-propanol, 2-methyl-2-amino-1-pentanol, morpholine, trimethylamine, tripropylamine, tributylamine, N-methylmorpholine, N-ethylmorpholine, pyridine, picoline, lutidine, quinoline, N, N-dimethylaniline, and N,N-diethylaniline.

As the preferred examples of the bisamine salts of imidodisulfonic acid of this invention, there are bis(diethanol-ammonium)imidodisulfonate,

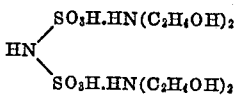

bis(1 - hydroxy-2-methyl-3-propylammonium)imidodisulfonate, bismorpholinium imidodisulfonate, bispyridinium imidodisulfonate, bis(N,N - dimethyl-phenyl-ammonium) imidodisulfonate and the like.

Free imidodisulfonic acid cannot be formed as a pure compound as it is unstable and is available as an aqueous solution of it, but the salt, in particular, the diammonium salt of the acid is a stable compound.

Therefore, the amine salts of imidodisulfonic acid may be produced generally by the two processes shown below.

One process is an exchange reaction of an ammonium salt of imidodisulfonic acid with a desired amine in a solution, in particular, in an aqueous solution. By the process, even though the production of the salts of tertiary amines is difficult, the salts of hydroxyamine can be easily produced in an aqueous solution under the conditions for maintaining the reaction system in the liquid phase and liberating ammonia, that is, for example, at a temperature of 0–100° C. for 0.2–6 hours under a reduced pressure or normal pressure in almost a stoichiometric mole ratio of the diammonium salt of imidodisulfonic acid and hydroxyamine or in a mole ratio wherein the hydroxyamine is slightly excessive.

The salt of tertiary amine may be preferably produced by the following method. That is, an aqueous solution of the ammonium salt of imidodisulfonic acid is passed through a cation-exchange resin column whereby the ammonium salt is converted into free imidodisulfonic acid, which is immediately neutralized with a desired amine. By the process, as imidodisulfonic acid is unstable, it is desirable to carry out the ion-exchange reaction and the neutralization at a temperature lower than about 35° C. particularly at 0–20° C.

Thus obtained salts of this invention are generally hygroscopic white crystals or oily and can be easily dissolved in water. The typical examples of the bisamine salts of this invention are shown in the following table about the melting point.

| Amine: | Melting point (° C.) |
|---|---|
| Quinoline | 113 |
| Pyridine | 148 |
| Beta-picoline | 95–97 |
| Alpha-picoline | 113–117 |
| 2,4-lutidine | 100–103 |
| Morpholine | 167 |
| N-methylmorpholine | 165–167 |
| Dimethylbenzylamine | 90–91.5 |
| Trimethylamine | 67 |
| Triethylamine | 82–84 |
| Monoethanolamine | Oily |
| Diethanolamine | Oily |
| Triethanolamine | Oily |
| 2-amino-1-methyl-ethanol | 100 |
| 2-amino-2-methyl-propanol | 102.0–102.8 |

The specific amine salts of imidodisulfonic acid of this invention can be used in various fields but the most important use is as a curing catalyst for aminoplasts.

Therefore, this invention further relates to a curing catalyst for aminoplasts. That is, it relates to a latent catalyst for water-soluble or water-dispersible acid-curing aminoplasts.

The acid-curing aminoplasts are used in large quantities as molding powders for making permanently infusible resinous articles, as binding agents in adhesives for various applications such as abrasives and plywood, as agents for treating textiles to improve their crease resistance, moisture resistance, shrink resistance, etc., and as agents for treating papers and cellulose fibers.

A remarkable feature of the curing catalysts of this invention is that they belong to irreversible so-called thermo degradating type catalysts. In this point, the curing catalyst of this invention is greatly different from the known catalysts conventionally used in the field, such as, $Zn(NO_3)_2$, $(NH_4)_2HPO_3$,

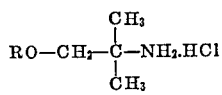

etc., which belong to reversible so-called thermo dissociating type catalysts.

Now, if the bisamine salts of this invention are shown by the formula $HN(SO_3H.A)_2$, wherein A is the above-mentioned amine, the catalytic mechanism of the catalysts of this invention is assumed to be as follows:

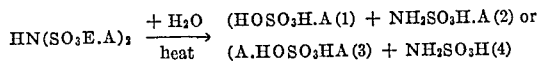

That is, the catalysts of this invention are, as shown in the above formula, irreversibly decomposed into an acid sulfate (1) or sulfamic acid (4), which accelerates curing of acid-curing aminoplasts.

On the other hand, in the case of the thermo dissociating type catalysts such as a hydrochloride of an amine which is a weak base, an acid is liberated reversibly as follows

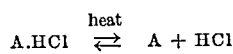

and the strong acid hydrogen chloride shows the curing action.

Besides such differences of the catalysts of this invention from the conventional catalysts in the mechanism, the amine salts and the tertiary amine salts of imidodisulfonic acid used as the curing catalyst of this invention are materials that have not hitherto been known, and the properties, in particular, the hydrolysis characteristics have been cleared first by us and at the same time it has been found that they have properties useful for the curing catalyst, which results in achieving the invention.

Hitherto, man kinds of catalysts have been used as the latent curing catalysts for thermo-setting amino resins. However, there are drawbacks in these catalysts that the conventional catalysts which are stable at a low temperature need the high curing temperature and must be used in a large quantity for effecting the catalytic action, on the contrary, the conventional catalysts which are highly active or effective in a small amount and have a low curing temperature are weak in the stability. The normal temperature stability is contrary to the curing power and hence it has been considered to be difficult to obtain the catalysts having excellent stability and curing power at the same time. While, from the studies about the characteristics of the novel salts of imidodisulfonic acid of this invention, the catalysts having the above-mentioned contrary properties simultaneously have been discovered.

That is, upon studying the hydrolysis characteristics of the various salts of imidodisulfonic acid, it has been found that even though the decomposition rates at normal temperature are generally negligibly small, there is a specific temperature range of about 75–120° C. in regard to specific salts where the decomposition rates are increased abruptly, and also there are remarkable differences among the salts about the period of time for causing the abrupt decreasing of pH when heated. Moreover, it has been cleared that when a neutral salt, such as, the ammonium salt or amine salt of sulfamic acid, ammonium sulfate or sodium sulfate, is added in the salts of imidodisulfonic acid, the period of time required for reducing abruptly the pH can be controlled or extended by adjusting the addition amount of the neutral salts. The pH changes of 2-amino-2-methyl-propanol-1 salt, mono-, di-, triethanolamine salt of imidodisulfonic acid and ammonium imidodisulfonate at 97.5° C. are illustrated in the attached drawing where the initial concentration of imidodisulfonate is 1.60 wt. percent and curve I stands for bisammonium salt, curve II bis(2-amino-2-methyl-propanol) salt, curve III bismonoethanol-amine salt, curve IV bistriethanolamine salt and curve V bisdiethanolamine salt, from which it is clear that each salt shows its abrupt pH reduction after its specific course.

Moreover, we have cleared that among the salts of imidodisulfonic acid, the amine salts, in particular, the hydroxyamine salts have excellent properties as the latent curing catalysts for thermosetting amino resins.

The various amine salts of imidodisulfonic acid, for example, the primary, secondary and teritary hydroxyamine salts, aliphatic teritary amine salts or the salts of the morphorine derivatives can be used as catalysts having good stability at normal temperature, and the weak basic amine salts such as pyridine bases or aromatic tertiary amine salts can be used as catalysts for low-temperature treatment, that is, the catalyst by which the treatment can be easily carried out. These various amine salts of imidodisulfonic acid have no such fault that gives out bad smell when used as the catalyst for an amino resin as in the case of using an ammonium salt catalyst. The treating temperature by these amine salts may be comparatively lower and as shown in Table 2, the stability of the amine salts at normal temperature is extremely high and the pH value is very excellent even in the acidic side as compared with ammonium imidodisulfonate which is a known catalyst. Further, in the case of treating textiles, the treated textiles are endowed with good embossed or glazed type finishes, which improve the quality of the textiles.

These amine salts of imidodisulfonic acid have all the merits of conventional catalysts are removed, and it can be said that the catalysts by this invention have almost ideal factors as the latent curing catalysts for thermosetting amino resins.

The catalysts of this invention show excellent faculties in the latent property and at the same time as the reduction of the pH at the curing temperature is extremely remarkable, the efficacy is extremely good and the catalytic amount can be reduced remarkably if necessary. Usually, the catalyst of this invention is suitably used in an amount of about 0.1–20%, as the solid catalyst, based on the solid components of the amino resin.

Now, as the typical examples of the amine salts of imidodisulfonic acid, about the case of dissolving the 2-amino-2-methyl-propanol-1 salt and the pyridine salt of imidodisulfonic acid in aqueous solutions of methylol urea, the change of pH at a normal temperature is measured and the results are compared with the case where conventional catalysts, such as, diammonium hydrogen phosphate, ammonium sulfonate, and 2-amino-2-methyl-propanol-1 hydro-chloride are dissolved in the solutions of methylol urea under the same conditions, of which the results are shown in Table 1. As seen from the table, it is clear that the stability of the solution of the resin at the addition of the catalyst at normal temperature is extremely good and the latent property as the curing catalyst is sufficient. Further, the comparison of them in the case of heating on a hot water bath (at 80–85° C.) is shown in Table 2 wherein the salts of imidodisulfonic acid show very excellent catalytic powers, i.e., the sufficient reduction of pH and curing of resins.

TABLE 1.—pH CHANGE OF RESIN SOLUTION ADDED WITH SOME CATALYSTS AT ROOM TEMPERATURE 26–31° C.

| | Run Number | | | | | | | | | | | | |
|---|---|---|---|---|---|---|---|---|---|---|---|---|---|
| | 1 | 2 | | 3 | | 4 | | 5 | | 6 | | 7 | |
| | Amount of cat. (percent) | | | | | | | | | | | | |
| Time (hrs.) | 0 | 2 | 5 | 2 | 5 | 2 | 5 | 2 | 5 | 2 | 5 | 2 | 5 |
| 0 | 8.67 | 7.68 | 7.58 | 7.09 | 6.73 | 7.13 | 6.70 | 7.46 | 7.32 | 7.65 | 7.82 | 6.43 | 6.00 |
| 1 | .61 | .29 | .27 | 6.93 | .56 | 6.86 | .42 | .59 | .40 | .70 | .85 | .85 | .13 |
| 2 | .56 | .18 | .18 | .87 | .50 | .80 | .35 | .63 | .47 | .72 | .65 | .92 | .25 |
| 3 | .52 | .12 | .10 | .82 | .47 | .78 | .29 | .70 | .50 | .74 | .70 | .97 | .27 |
| 4 | .52 | .05 | .05 | .82 | .45 | .85 | .20 | .70 | .50 | .75 | .70 | 7.02 | .30 |
| 5 | .40 | .02 | .00 | .78 | .35 | .80 | .10 | .73 | .53 | .75 | .63 | .05 | .30 |
| 6 | .50 | 6.98 | 6.93 | .70 | .27 | .70 | .08 | .70 | .60 | .78 | .65 | .08 | .30 |
| 8 | .28 | .95 | .89 | .70 | .15 | .63 | .12 | .75 | .56 | .78 | .59 | .08 | .28 |
| 24 | .35 | .71 | .58 | .38 | 5.83 | .33 | 5.77 | .70 | .50 | .72 | .52 | .09 | .03 |
| 32 | .23 | .57 | .38 | .23 | .70 | .30 | .63 | .61 | .38 | .60 | .40 | .00 | 5.84 |
| 48 | .07 | .40 | .08 | .04 | .60 | .03 | .29 | .63 | .39 | .60 | .35 | 6.40 | .15 |
| 72 | .10 | .20 | 5.61 | 5.85 | 4.76 | 5.93 | *3.68 | .59 | .30 | .52 | .21 | 5.49 | *3.22 |

*C—cf. Note 4 at end of Table 2.

TABLE 2.—pH CHANGE AND TURBIDITY BY HEATING TEST (HEATING TEMPERATURE: 80–85° C.)

| | Run Number | | | | | | | | | | | | |
|---|---|---|---|---|---|---|---|---|---|---|---|---|---|
| | 8 | 9 | | 10 | | 11 | | 12 | | 13 | | 14 | |
| | Amount of cat. (percent) | | | | | | | | | | | | |
| Time (hrs.) | 0 | 2 | 5 | 2 | 5 | 2 | 5 | 2 | 5 | 2 | 5 | 2 | 5 |
| 0 | 8.32 A | 7.53 A | 7.43 A | 6.80 A | 6.41 A | 6.97 A | 6.51 A | 7.60 A | 7.60 A | 7.60 A | 7.82 A | 6.40 A | 6.05 A |
| 1 | 6.83 A | 3.37 C | 2.97 B | 2.70 A | 2.29 C | 2.70 B | 2.05 C | 5.62 A | 4.90 A | 5.80 B | 4.10 B | 3.18 E | 2.22 E |
| 2 | 6.50 A | 2.75 E | 2.65 E | 2.25 E | 2.09 E | 2.10 E | 1.78 E | 3.62 D | 3.30 D | 3.06 E | 2.20 E | | |

NOTE 1.—Resin solution tested: 10% aq. solution of urea-formalin reaction product.
NOTE 2.—Amount of catalyst: Solid to solid weight percent.
NOTE 3.—Catalyst:

Run Number:     Catalyst
1, 8     No catalyst.
2, 9     $(NH_4)_2HPO_4$
3, 10     $NH_2SO_3NH_4$
4, 11     $NH(SO_3NH_4)_2$
5, 12     $HO-CH_2C(CH_3)_2-NH_2 \cdot HCl$
6, 13     $NH(SO_3H \cdot H_2NC(CH_3)_2CH_2OH)_2$*

7, 14     $NH(SO_3H \cdot N\langle C_5H_5\rangle)_2$*

*This invention.

NOTE 4.—Turbidity: A=clear; B=slightly turbid; C=turbid; D=gelatinized; E=solidified.

It is also clear from the experimental results shown in Table 1 that the weaker basic amine salt such as the pyridine salt of imidodisulfonic acid is effective as the curing catalyst for producing normal-temperature curable adhesives since the amine salt reduces the pH rapidly when the system is maintained at room temperature for a long period of time, which accelerate curing the amino resin.

The water-soluble or water-dispersible acid-curing thermosetting condensation products cured by the catalysts of this invention include typically urea-formaldehyde condensates, alkylethers of methylol urea such as dimethylolurea and the monomethyl ethers of dimothylolurea, melamine-formaldehyde condensates, and alkylethers of methylolmelamine. The condensation products further include, however, thiourea-formaldehyde condensater-guanidine-formaldehyde condensates, dicyandiamide-formaldehyde condensates, and diaminotriazine-formaldehyde condensates such as benzo-guanamine.

In the case of using the condensation products as molding powders or adhesives, cellulosic materials such as alpha-cellulose, pulp, wood powders, cotton, linters, etc., may be used together if necessary.

The following examples are given in illustration and are not intended to limit the scope of this invention. Where parts are mentioned, they are parts by weight.

Example 1

Through the following ion-exchange column was passed 200 g. of an equeous solution (21.1% solution) of 42.4 g. of bisammonium imidodisulfonate at a temperature below 20° C. and a a flow rate of 90 ml./min. The ion-exchange resin column was prepared by filling 200 g. of a strong acidic ion-exchange resin: Amberlite IB-120 in a hard glass tube of 24 mm. of inside diameter in the height of 670 mm. The exchange capacity was 0.52 mol.

The amount of free imidodisulfonic acid in the aqueous solution of free imidodisulfonic acid obtained by the above treatment was 98.2% of the calculated value.

Into thus obtained solution of free imidodisulfonic acid was added 64 g. of pyridine and the mixture was concentrated at 20° C. under a reduced pressure to deposit a crystal, which was filtered and dried to afford 61.5 g. of a pyridine salt (M.P. 148° C.) of imidodisulfonic acid.

Example 2

Into the aqueous solution of free imidodisulfonic acid obtained as in Example 1 was added 60 g. of an equeous 30% solution of trimethylamine while cooling and the solution was concentrated at 20° C. under a reduced pressure into 70 g. Into the concentrated solution was added 200 cc. of methanol and the solution was cooled to −50 to −60° C. strongly and thus deposited crystal was filtered and dried to give 53.2 g. of a crystal (M.P. 67° C.) of the trimethylamine salt of imidodisulfonic acid. The yield was 90%.

Example 3

The aqueous solution of free imidodisulfonic acid obtained as in Example 1 by using 32.7 g. of bisammonium imidodisulfonate was added into 44.8 g. of triethanolamine and thus obtained neutralized solution was distilled to remove water at about 20° C. under a reduced pressure of 7.5–8.0 mm. Hg. By the process was obtained 75 g. of a triethanolamine salt of imidodisulfonic acid, which was almost colorless oily material.

Example 4

A mixture of 380 parts of 2-amino-2-methyl-propanol-1 and 1200 parts of water was added with 422 parts of bisammonium imidodisulfate and they were vacuum-distilled on a water bath by using an aspirator and dried. Thus obtained residual was washed with a small amount of cold ethanol and dried in a vacuum desiccator to give 639 parts of a colorless crystal (M.P. 120.0–120.8° C.) of bis-2-amino-2-methyl-propanol-1 salt of imidodisulfonic acid. The yield was 90%.

Example 5

Into an aqueous solution of 214 parts of 2-amino-2-methyl-propanol-1 in 600 parts of water was added 238 parts of ammonium imidodisulfonate (the propanol was 5% excessive to the stoichiometric value to the amount of the imidodisulfonate) and after removing free ammonia at 60–90° C. under a reduced pressure, the solution was neutralized with the addition of about 100 parts of a 10% solution of sulfamic acid followed by diluting with water into 1000 parts of the whole solution. The solution contained about 40% the bis(2-amino-2-methyl-propanol-1) salt of imidodisulfonic acid.

In an aqueous solution prepared by adding 1% above-stated catalyst solution into an aqueous 20% solution of water soluble methylol-melamine were immersed fabric fibers. By pre-drying the fibers at 70–90° C. and curing for 4 minutes at 150° C. sufficient curing occurred and the resin treatment was applied effectively on the fibers.

Example 6

Into 100 parts of a liquid urea-formaldehyde reaction product dissolved in 72 parts of water were added 85 parts of alpha-cellulose and 5 parts of a 40% aqueous solution of bis(dimethanolamine) salt of imidodisulfonic acid. They were mixed at room temperature until the liquid resin was uniformly absorbed by the cellulose. The mixture was then dried until essentially free from water in a ventilated oven at 80° C. and thereafter ground in a ball mill.

The resultant powder was molded into a disc at 150° C. and 4000 p.s.i. for 75 sec. The molded disc had a hard brilliant surface and showed very low water absorption. The molding powder was stable in storage indefinitely.

The addition of the catalysts of this invention to acid-curing aminoplasts makes possible the production of compositions which are stable at normal temperature and which may be cured in a relatively short time at temperatures ranging from 120 to 160° C.

It is obvious that many variations may be made in the process and products of this invention without departing from the spirit and the scope thereof as defined in the appended claims.

What is claimed is:
1. Bispyridine salt of imidodisulfonic acid.
2. Bisdimethylaniline salt of imidodisulfonic acid.
3. A bis-amine salt of imidodisulfonic acid, said amine being selected from the group consisting of trimethylamine, triethylamine, tripropylamine, tributylamine and dimethylbenzylamine.

References Cited

Boatman et al.: Journal of the American Chemical Society, vol. 73, (2), pp. 559–60.

HENRY R. JILES, *Primary Examiner.*

ALAN L. ROTMAN, *Assistant Examiner.*

U.S. Cl. X.R.

260—17.3, 66.7, 71, 247.1, 283, 501.12, 579, 583, 584, 849